United States Patent
Takada (10) Patent No.: US 6,630,955 B2
(45) Date of Patent: *Oct. 7, 2003

(54) SOLID-STATE IMAGE-SENSING APPARATUS WITH TEMPERATURE CORRECTION AND METHOD OF CALIBRATING THE SAME

(75) Inventor: Kenji Takada, Itami (JP)

(73) Assignee: Minolta Co. Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 44 days.

(21) Appl. No.: 09/551,054

(22) Filed: Apr. 18, 2000

(65) Prior Publication Data

US 2002/0085102 A1 Jul. 4, 2002

(30) Foreign Application Priority Data

Apr. 22, 1999 (JP) .............................. 11-114397

(51) Int. Cl.$^7$ ................................ H04N 5/217
(52) U.S. Cl. ....................................... 348/241
(58) Field of Search ................. 348/241, 243, 348/244, 251; 358/461

(56) References Cited

U.S. PATENT DOCUMENTS

| 4,703,442 A | * | 10/1987 | Levine | 348/244 |
| 5,289,286 A | * | 2/1994 | Nakamura et al. | 348/223 |
| 5,625,413 A | * | 4/1997 | Katoh et al. | 348/243 |

* cited by examiner

Primary Examiner—Wendy R. Garber
Assistant Examiner—Rashawn N Tillery
(74) Attorney, Agent, or Firm—Sidley Austin Brown & Wood LLP

(57) ABSTRACT

In an image-sensing apparatus, the shading data acquired when uniform light is shone on a sensor 1 is stored in a memory 3, and the temperature T0 of the sensor 1 detected by a temperature detector 6 at that time is stored in a calculation circuit 7. During image shooting, the temperature T of the sensor 1 is detected by the temperature detector 6 so as to calculate the temperature ratio T/T0 of this temperature to the temperature T0 stored in the calculation circuit 7. Then, a temperature compensation circuit 41 multiplies the shading data for the pixels that output image data by T/T0. A correction calculation circuit (COR) 4 subtracts the shading data thus multiplied by T/T0 from the image data, and thereby the unevenness in sensitivity among the pixels of the sensor 1 is corrected.

28 Claims, 3 Drawing Sheets

SOLID-STATE IMAGE-SENSING APPARATUS WITH TEMPERATURE CORRECTION AND METHOD OF CALIBRATING THE SAME

This application is based on application No. H11-114397 filed in Japan on Apr. 22, 1999, the entire content of which is hereby incorporated by reference.

BACKGROUND OF THE INVENTION

1. Field of the Invention

The present invention relates to an image-sensing apparatus, and in particular to an image-sensing apparatus incorporating a solid-state image-sensing device having a characteristic that an output voltage thereof varies natural-logarithmically in accordance with the amount of received light.

2. Description of the Prior Art

Figure 1:
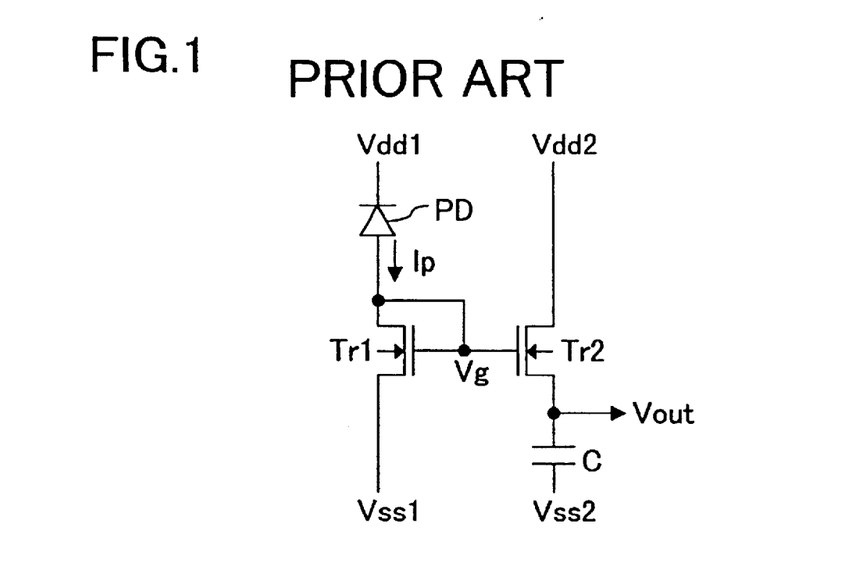
FIG. 1 is a diagram showing the circuit configuration of each of the pixels constituting a solid-state image-sensing device.

FIG. 1 shows a solid-state image-sensing element (hereafter referred to as a "pixel") employed in a conventional solid-state image-sensing device having a characteristic that an output voltage thereof varies natural-logarithmically in accordance with the amount of received light. The pixel shown in FIG. 1 is composed of a photodiode PD that receives at its cathode a voltage Vdd1, an N-channel MOS transistor Tr1 that has its drain and gate connected to the anode of the photodiode PD and that receives at its source a voltage Vss1, an N-channel MOS transistor Tr2 that has its gate connected to the gate of the transistor Tr1 and that receives at its drain a voltage Vdd2, and a capacitor C that has one end connected to the source of the transistor Tr2 and that receives at the other end a voltage Vss2. Here, the voltage appearing at the node between the source of the transistor Tr2 and the capacitor C is used as the output voltage Vout. The voltages mentioned above fulfill the relations Vdd1>Vss1 and Vdd2>Vss2.

How this pixel works will be described briefly below. This pixel exploits the subthreshold characteristics that the transistor Tr1 exhibits when its gate-source voltage is lower than the threshold voltage. When light is shone on the photodiode PD and, as a result, a current Ip flows through the transistor Tr1, the gate voltage Vg of the transistor Tr1 varies natural-logarithmically in accordance with the current Ip. This gate voltage Vg causes a current to flow also through the transistor Tr2, and thus electric charge is accumulated in the capacitor C. As a result of this electric charge being accumulated in the capacitor C, the output voltage Vout appears, which is given as $$Vout = Vss1 + \frac{nkT}{q}\ln\left(\frac{q}{nkTC}\int Ipdt\right) \quad (1)$$

where q represents the amount of electric charge carried by an electron, k represents the Boltzmann constant, n represents a constant determined according to the structure of the transistor, T represents the absolute temperature, and C represents the capacitance of the capacitor C.

A solid-state image-sensing device has a plurality of pixels, each having a characteristic as described above, arranged in an array, and is further provided with transfer means for transferring the output voltages from the individual pixels. In such a solid-state image-sensing device, the individual pixels have different sensitivities, and therefore, even if uniform light is shone on them, the voltages output from the individual pixels differ from one another. To overcome this problem, U.S. Pat. No. 5,289,286 proposes an image-sensing apparatus in which the differences in sensitivity among the individual pixels are compensated for.

Figure 6:
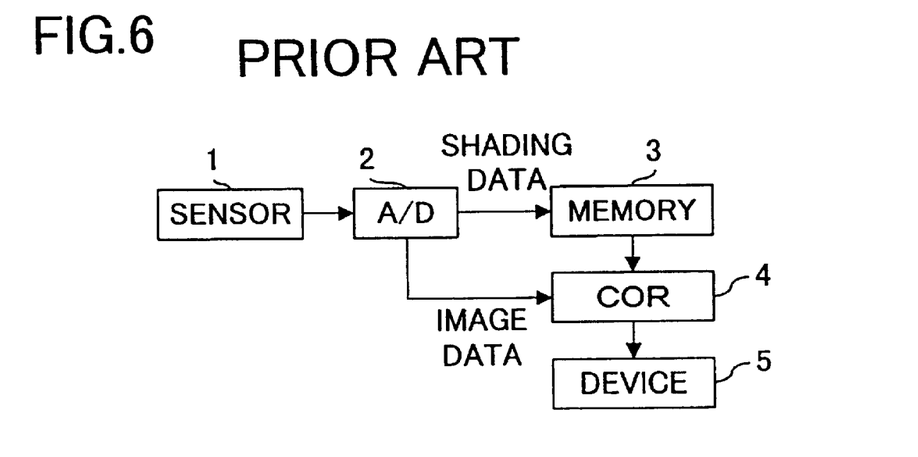
FIG. 6 is a block diagram showing the internal configuration of a conventional image-sensing apparatus.

The configuration of the image-sensing apparatus proposed in U.S. Pat. No. 5,289,286 mentioned above will be described briefly below with reference to FIG. 6, which shows a block diagram thereof. The image-sensing apparatus shown in FIG. 6 is composed of an image-sensing device (hereafter referred to as the "sensor") 1 that has a plurality of pixels each producing an output voltage varying natural-logarithmically in accordance with the amount of received light and that has transfer means for transferring the outputs from the individual pixels, an analog-to-digital converter (hereafter referred to as the "A/D converter") 2 for performing analog-to-digital conversion on the voltage output from the sensor 1, a memory 3 for storing the digital value obtained as a result of conversion performed by the A/D converter 2, a correction calculation circuit (hereafter referred to as the "COR") 4 for subtracting the shading data stored beforehand in the memory 3 from the image data fed from the A/D converter 2 during actual image shooting so as to correct the image data, and a device 5, such as a storage device or printer, that is fed with the image data corrected by the COR 4.

In this image-sensing apparatus configured as described above, first, uniform light is shone on the sensor 1, and, for each pixel, the digital data representing the output voltage obtained therefrom is stored in the memory 3. Then, during actual image shooting, the image data acquired is corrected on the basis of the above-mentioned digital data, called the shading data, that was stored in the memory 3 when uniform light was shone on the sensor 1, and the thus corrected image data is output to the device 5. By correcting the image data in this way, it is possible to correct the unevenness in sensitivity among the individual pixels of the sensor 1.

Suppose that an amount L of light is shone on a pixel having a sensitivity α. Then, the output voltage Vout1, which varies in accordance with the amount L of light and the temperature T of the sensor 1, is given by Equation (2) below. On the other hand, when an amount L0 of uniform light is shone on the sensor 1 to store the shading data in the memory 3, the pixel having a sensitivity a produces an output voltage Vout2 as given by Equation (3) below (the temperature of the sensor 1 at this time is assumed to be T0). Subtracting Equation (3) from Equation (2) at each side thereof yields a difference Vd as given by Equation (4) below.

$$Vout1 = Vss1 + \frac{nkT}{q}\ln\left(\frac{q}{nkTC}\int L\cdot \alpha dt\right) \quad (2)$$

$$Vout2 = Vss1 + \frac{nkT0}{q}\ln\left(\frac{q}{nkT0\cdot C}\int L0\cdot \alpha dt\right) \quad (3)$$

$$Vd = \frac{nkT}{q}\ln\left(\frac{q}{nkT\cdot C}\int L\cdot dt\right) - \frac{nkT0}{q}\ln\left(\frac{q}{nkT0\cdot C}\int L0\cdot dt\right) + \frac{nk}{q}(T-T0)\ln(\alpha) \quad (4)$$

During image shooting, when the temperature of the sensor 1 equals to T0, the third term of the right side of Equation (4) equals 0, which means that the term that depends on the sensitivity α of the pixel disappears. Therefore, in this case, by subjecting the image data fed from the individual pixels of the sensor 1 to correction as defined by Equation (4), it is possible to suppress the unevenness in sensitivity among the individual pixels. However, when the temperature of the sensor 1 differs from T0, the term that depends on the sensitivity α of the pixel remains, and therefore, even if the image data fed from the individual pixels of the sensor 1 is subjected to correction as defined by Equation (4), it is not possible to suppress the unevenness in sensitivity among the individual pixels.

As described above, if the temperature at which the image data is acquired differs from the temperature at which the shading data is acquired, it is not possible to correct properly the unevenness in sensitivity among the pixels on the basis of that shading data. For this reason, the sensor 1 needs to be illuminated with uniform light to acquire appropriate shading data anew on every shooting occasion. Quite inconveniently, this requires either additional provision of a means for irradiating uniform light or manually performing shading with a diffusion cap fitted on the lens.

SUMMARY OF THE INVENTION

An object of the present invention is to provide an image-sensing apparatus incorporating a solid-state image-sensing device that permits the unevenness in sensitivity among the individual pixels thereof to be corrected properly on the basis of previously stored shading data irrespective of temperature variation.

To achieve the above object, according to one aspect of the present invention, an image-sensing apparatus is provided with: a solid-state image-sensing device composed of a plurality of pixels each having a characteristic that the output voltage thereof varies natural-logarithmically in accordance with the amount of light received; a detector for detecting the temperature of the solid-state image-sensing device; a storage device for storing first output data as to the output voltages from the individual pixels of the solid-state image-sensing device as acquired by shining uniform light on the solid-state image-sensing device, and for storing first temperature data as to the temperature of the solid-state image-sensing device as detected by the detector during acquisition of the first output data; a calculator for calculating, on the basis of the first temperature data stored in the storage device and second temperature data as to the temperature of the solid-state image-sensing device as detected by the detector during image shooting, the temperature ratio of the second temperature data to the first temperature data; a first corrector for correcting, on the basis of the temperature ratio calculated by the calculator, the first output data stored in the storage device; and a second corrector for correcting, on the basis of the first output data corrected by the first corrector, second output data as to the output voltages from the individual pixels of the solid-state image-sensing device as acquired during image shooting.

According to another aspect of the present invention, an image-sensing apparatus is provided with: a solid-state image-sensing device composed of a plurality of pixels each having a characteristic that the output voltage thereof varies natural-logarithmically in accordance with the amount of light received; a detector for detecting the temperature of the solid-state image-sensing device; a storage device for storing first output data as to the output voltages from the individual pixels of the solid-state image-sensing device as acquired by shining uniform light on the solid-state image-sensing device, and for storing first temperature data as to the temperature of the solid-state image-sensing device as detected by the detector during acquisition of the first output data; a calculator for calculating, on the basis of the first temperature data stored in the storage device and second temperature data as to the temperature of the solid-state image-sensing device as detected by the detector during image shooting, the temperature ratio of the second temperature data to the first temperature data; a first corrector for correcting, on the basis of the temperature ratio calculated by the calculator, second output data as to the output voltages from the individual pixels of the solid-state image-sensing device as acquired during image shooting; and a second corrector for correcting, on the basis of the first output data stored in the storage device, the second output data corrected by the first corrector.

According to still another aspect of the present invention, an image-sensing apparatus is provided with: a solid-state image-sensing device composed of a plurality of pixels each having a characteristic that the output voltage thereof varies natural-logarithmically in accordance with the amount of light received; a calibrator for calibrating, on the basis of calibration data for correcting variations in the output voltages from the individual pixels of the solid-state image-sensing device, output data as to the output voltages from the individual pixels of the solid-state image-sensing device as acquired during image shooting; and a temperature compensator for performing temperature compensation, on the basis of temperatures of the solid-state image-sensing device as detected during acquisition of the calibration data and as detected during image shooting, on either the calibration data or the output data acquired during image shooting.

BRIEF DESCRIPTION OF THE DRAWINGS

This and other objects and features of the present invention will become clear from the following description, taken in conjunction with the preferred a embodiments with reference to the accompanying drawings in which.

DESCRIPTION OF THE PREFERRED EMBODIMENTS

Figure 2:
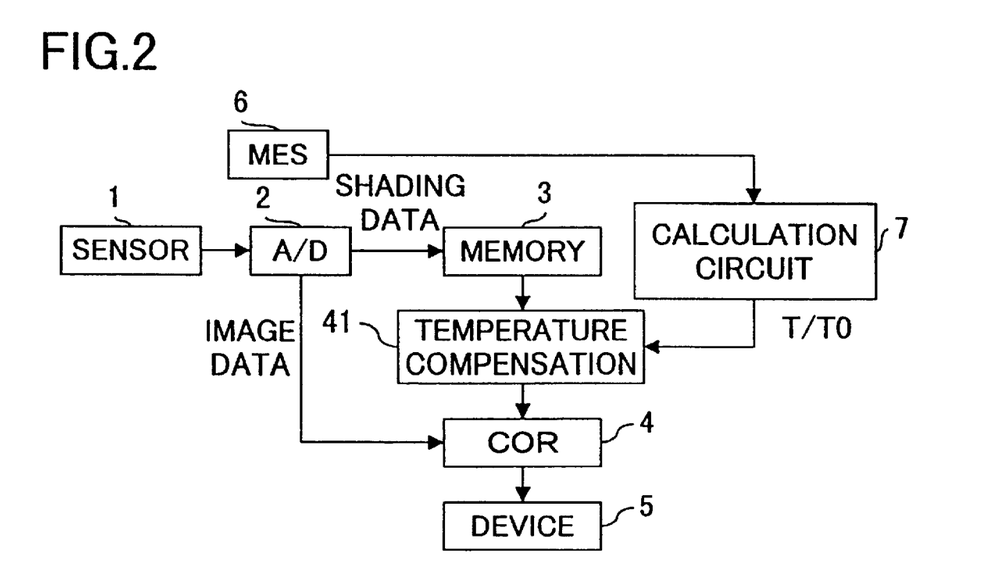
FIG. 2 is a block diagram showing the internal configuration of the image-sensing apparatus of a first embodiment of the invention.

First, a first embodiment of the present invention will be described with reference to the relevant drawings. FIG. 2 is a block diagram showing the internal configuration of the image-sensing apparatus of this embodiment. It is to be noted that, of the blocks constituting the image-sensing apparatus shown in FIG. 2, such blocks as are used for the same purposes as in the conventional image-sensing apparatus shown in FIG. 6 are identified with the same reference numerals, and their detailed descriptions will not be repeated.

The image-sensing apparatus shown in FIG. 2 has a solid-state image-sensing device (hereafter referred to as the "sensor") such as a CCD-type or CMOS-type solid-state image-sensing device composed of a plurality of pixels each having a characteristic that the output voltage thereof varies natural-logarithmically in accordance with the amount of light received, an A/D converter 2, a memory 3, a COR 4, a device 5, a temperature detector (hereafter referred to as the "MES") 6 for detecting the temperature of the sensor 1 using a temperature sensor such as a thermocouple or thermistor, a calculation circuit 7 for storing the reference temperature T0 detected by the MES 6 when shading data is acquired with uniform light shone on the sensor 1 and for calculating the ratio T/T0 of the temperature T of the sensor 1 detected by the MES 6 during image shooting to the reference temperature T0, and a temperature compensation circuit 41 for multiplying the shading data fed from the memory 3 by the ratio T/T0 fed from the calculation circuit 7 and for feeding the resulting data to COR 4.

Now, how this image-sensing apparatus operates will be described. First, to acquire shading data, an amount L0 of uniform light is shone on the sensor 1. At this time, the output voltages of the individual pixels constituting the sensor 1 are converted into digital data by the AND converter 2, and this digital data is stored in the memory 3. Moreover, at the same time, the temperature T0 of the sensor 1 detected by the MES 6 is fed to the calculation circuit 7, and is stored as a reference temperature in the memory (not shown) provided in the calculation circuit 7. In this way, shading data is acquired for each pixel. The output voltage V(T0) of the shading data thus acquired is given by Equation (5) below. It is to be noted that Equation (5) is equivalent to Equation (3).

$$V(T0) = Vss1 + \frac{nkT0}{q}\ln\left(\frac{q}{nkT0 \cdot C}\int L0 \cdot \alpha dt\right) \quad (5)$$

This image-sensing apparatus, once the shading data and the reference temperature T0 are stored therein, operates as follows when an image is shot. The image data of the image shot is fed, pixel by pixel, from the sensor 1 to the A/D converter 2 so as to be converted into digital data. At the same time, the MES 6 detects the temperature T of the sensor 1, and the calculation circuit 7 calculates the ratio T/T0 of the temperature T thus detected to the reference temperature T0. The output voltage V(T) of the image data acquired here is given by Equation (6) below. It is to be noted that Equation (6) is equivalent to Equation (2).

$$V(T) = Vss1 + \frac{nkT}{q}\ln\left(\frac{q}{nkTC}\int L \cdot \alpha dt\right) \quad (6)$$

Then, the shading data of the pixels that have output the image data and the temperature ratio T/T0 are fed from the memory 3 and the calculation circuit 7, respectively, to the temperature compensation circuit 41. The temperature compensation circuit 41 multiplies the shading data by the temperature ratio T/T0. Thus, the output voltage of the shading data is made to have a voltage V1(T0) as given by Equation (7) below.

$$V1(T0) = \frac{T}{T0}Vss1 + \frac{nkT}{q}\ln\left(\frac{q}{nkT0 \cdot C}\int L0 \cdot \alpha dt\right) \quad (7)$$

In this way, the shading data multiplied by the temperature ratio by the temperature compensation circuit 41 is fed to the COR 4, and the image data converted into digital data by the A/D converter 2 is also fed to the COR 4. Then, in the COR 4, the shading data is subtracted from the image data. Thus, the output voltage of the image data is made to have a voltage V1(T) as given by Equation (8) below.

$$V1(T) = \left(1 - \frac{T}{T0}\right)Vss1 + \frac{nkT}{q}\ln\left(\frac{T0}{T} \cdot \frac{\int L \cdot dt}{\int L0 \cdot dt}\right) \quad (8)$$

As Equation (8) clearly indicates, the voltage V1(T) does not include the sensitivity α of the pixel as a parameter, which means that the unevenness in sensitivity among the individual pixels is completely corrected in the image data obtained ultimately. The thus corrected image data is then output to the device 5.

Figure 3:
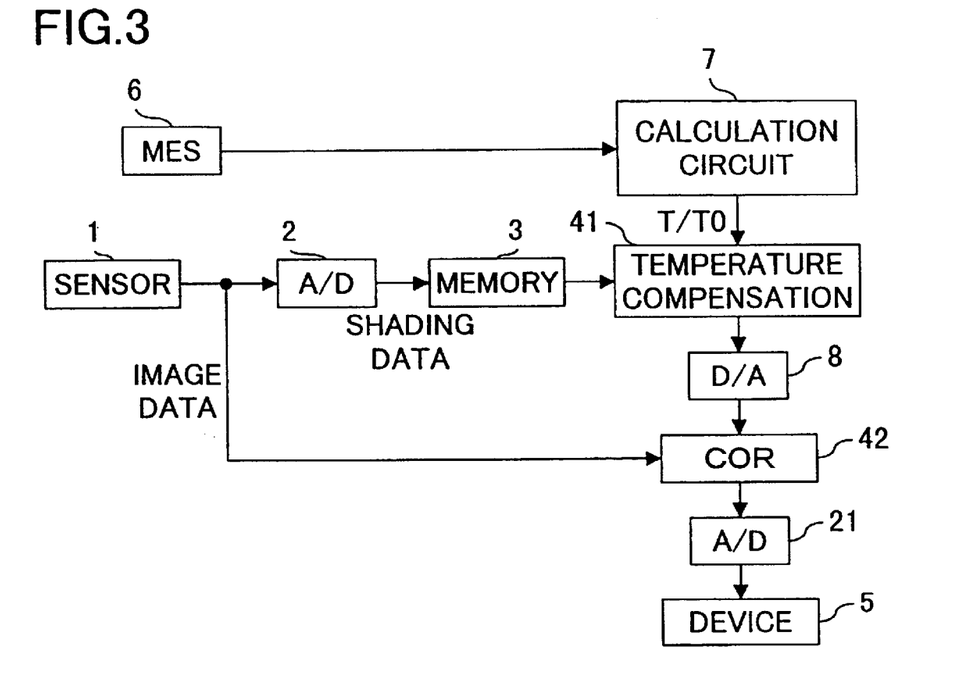
FIG. 3 is a block diagram showing the internal configuration of the image-sensing apparatus of a second embodiment of the invention.

Next, a second embodiment of the present invention will be described with reference to the relevant drawings. FIG. 3 is a block diagram showing the internal configuration of the image-sensing apparatus of this embodiment. It is to be noted that, of the blocks constituting the image-sensing apparatus shown in FIG. 3, such blocks as are used for the same purposes as in the image-sensing apparatus shown in FIG. 2 are identified with the same reference numerals, and their detailed descriptions will not be repeated.

The image-sensing apparatus shown in FIG. 3 has a sensor 1, an A/D converter 2, a memory 3, a temperature compensation circuit 41, a device 5, a MES 6, a calculation circuit 7, a digital-to-analog converter (hereafter referred to as the "D/A converter") 8 for performing digital-to-analog conversion on the shading data that has been subjected to temperature compensation performed by the temperature compensation circuit 41, a COR 42 for correcting the image data by subtracting from the voltage obtained directly from the sensor 1 the shading data fed from the D/A converter 8 as analog data that is obtained by performing temperature compensation and then digital-to-analog conversion on the original shading data, and an A/D converter 21 for performing analog-to-digital conversion on the corrected image data fed from the COR 42.

In this image-sensing apparatus configured as described above, as in the image-sensing apparatus of the first embodiment, first, uniform light is shone on the sensor 1 to store shading data in the memory 3, and the reference temperature T0 is stored in the calculation circuit 7. Once the shading data and the reference temperature T0 are stored therein, the image-sensing apparatus operates as follows during image shooting.

During image shooting, the pixels of the sensor 1 output image data, the MES 6 detects the temperature T of the sensor 1, and the calculation circuit 7 calculates the temperature ratio T/T0 and feeds it to the temperature compensation circuit 41. The temperature compensation circuit 41 receives from the memory 3 the shading data of the pixels that have output the image data, and multiplies that shading data by the temperature ratio T/T0.

The shading data thus multiplied by the temperature ratio T/T0 is converted into analog data by the D/A converter 8, and is then fed to the COR 42. In the COR 42, the shading data fed thereto from the D/A converter 8 is subtracted from the image data fed thereto from the sensor 1. The image data thus corrected is converted into digital data by the A/D converter 21, and is then output to the device 5.

Figure 4:
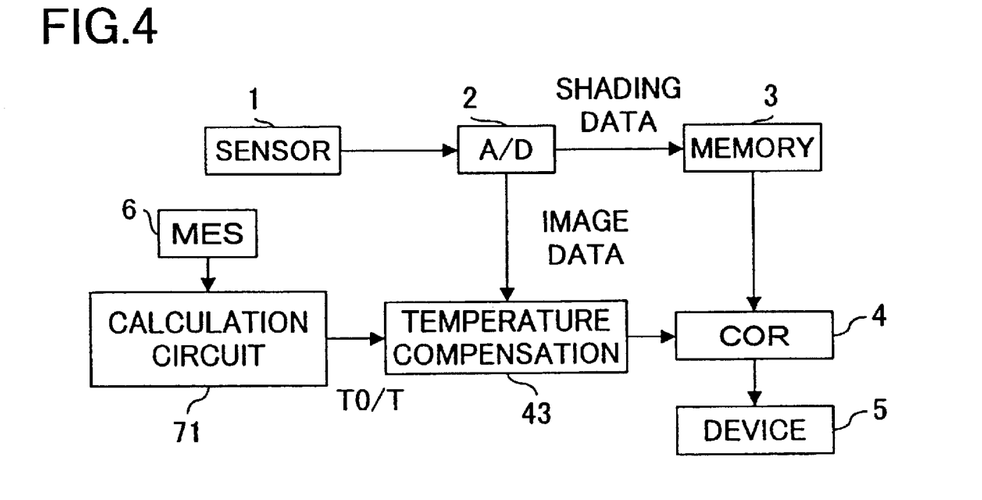
FIG. 4 is a block diagram showing the internal configuration of the image-sensing apparatus of a third embodiment of the invention.

Next, a third embodiment of the present invention will be described with reference to the relevant drawings. FIG. 4 is a block diagram showing the internal configuration of the image-sensing apparatus of this embodiment. It is to be noted that, of the blocks constituting the image-sensing apparatus shown in FIG. 4, such blocks as are used for the same purposes as in the image-sensing apparatus shown in FIG. 2 are identified with the same reference numerals, and their detailed descriptions will not be repeated.

The image-sensing apparatus shown in FIG. 4 has a sensor 1, an A/D converter 2, a memory 3, a COR 4, a device 5, a MES 6, a calculation circuit 71 for storing the reference temperature T0 detected by the MES 6 when shading data is acquired with uniform light shone on the sensor 1 and for calculating the ratio T0/T of the reference temperature T0 to the temperature T of the sensor 1 detected by the MES 6 during image shooting, and a temperature compensation circuit 43 for multiplying the image data fed from the A/D converter 2 by the ratio T0/T fed from the calculation circuit 71 and then feeding the resulting data to the COR 4.

Now, how this image-sensing apparatus operates will be described. First, as in the first embodiment, while an amount L0 of uniform light is being shone on the sensor 1, shading data is stored in the memory 3, and the reference temperature T0 is stored in the calculation circuit 71. The output voltage V(T0) of the shading data acquired here is given, as in the first embodiment, by Equation (5) noted earlier.

This image-sensing apparatus, once the shading data is stored therein, operates as follows when an image is shot. The image data of the image shot is fed, pixel by pixel, from the sensor 1 to the A/D converter 2 so as to be converted into digital data. At the same time, the MES 6 detects the temperature T of the sensor 1, and the calculation circuit 71 calculates the ratio T0/T of the reference temperature T0 to the temperature T thus detected. The output voltage V(T) of the image data acquired here is given, as in the first embodiment, by Equation (6) noted earlier.

Then, the image data and the temperature ratio T0/T are fed from the A/D converter 2 and the calculation circuit 71, respectively, to the temperature compensation circuit 43. The temperature compensation circuit 43 multiplies the image data by the temperature ratio T0/T. Thus, the output voltage of the image data is made to have a voltage V2(T) as given by Equation (9) below.

$$V2(T) = \frac{T0}{T} Vss1 + \frac{nkT0}{q} \ln\left(\frac{q}{nkTC} \int L \cdot \alpha dt\right) \quad (9)$$

In this way, the image data multiplied by the temperature ratio by the temperature compensation circuit 43 is fed to the COR 4, and the shading data of the pixels that have output the image data is also fed from the memory 3 to the COR 4. Then, in the COR 4, the shading data is subtracted from the image data. Thus, the output voltage of the image data is made to have a voltage V3(T) as given by Equation (10) below.

$$V3(T) = \left(\frac{T0}{T} - 1\right) Vss1 + \frac{nkT0}{q} \ln\left(\frac{T0}{T} \cdot \frac{\int L \cdot dt}{\int L0 \cdot dt}\right) \quad (10)$$

As Equation (10) clearly indicates, the voltage V3(T) does not include the sensitivity α of the pixel as a parameter, which means that the unevenness in sensitivity among the individual pixels is completely corrected in the image data obtained ultimately. The thus corrected image data is then output to the device 5.

Figure 5:
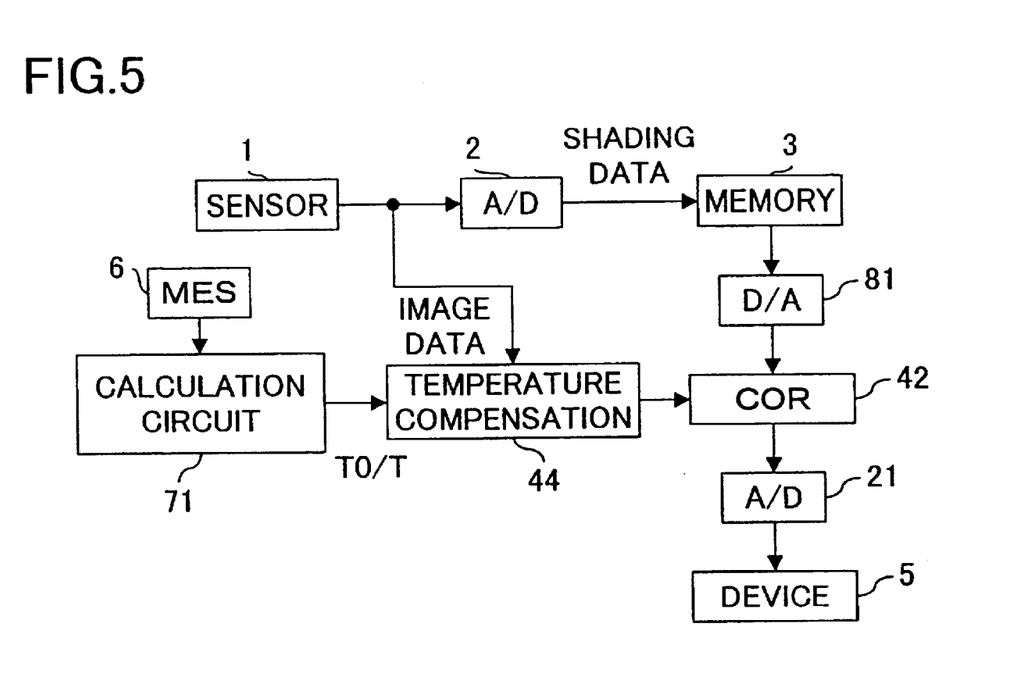
FIG. 5 is a block diagram showing the internal configuration of the image-sensing apparatus of a fourth embodiment of the invention.

Next, a fourth embodiment of the present invention will be described with reference to the relevant drawings. FIG. 5 is a block diagram showing the internal configuration of the image-sensing apparatus of this embodiment. It is to be noted that, of the blocks constituting the image-sensing apparatus shown in FIG. 5, such blocks as are used for the same purposes as in the image-sensing apparatuses shown in FIGS. 3 and 4 are identified with the same reference numerals, and their detailed descriptions will not be repeated.

The image-sensing apparatus shown in FIG. 5 has a sensor 1, A/D converters 2 and 21, a memory 3, a COR 42, a device 5, a MES 6, a calculation circuit 71, a D/A converter 81 for performing digital-to-analog conversion on the shading data fed from the memory 3, and a temperature compensation circuit 44 for multiplying the output voltage of the image data obtained directly from the sensor 1 by the ratio T0/T fed from the calculation circuit 71 and then feeding the resulting data to the COR 42.

In this image-sensing apparatus configured as described above, as in the image-sensing apparatus of the third embodiment, first, while uniform light is being shone on the sensor 1, shading data is stored in the memory 3, and the reference temperature T0 is stored in the calculation circuit 71. The image-sensing apparatus, once the shading data and the reference temperature T0 are stored therein, operates as follows when an image is shot.

During image shooting, the pixels of the sensor 1 output image data, the MES 6 detects the temperature T of the sensor 1, and the calculation circuit 71 calculates the temperature ratio T0/T and feeds it to the temperature compensation circuit 44. The temperature compensation circuit 44 receives the image data directly from the sensor 1, and multiplies this image data by the temperature ratio T0/T.

Then, the image data thus multiplied by the temperature ratio T0/T is fed to the COR 42. On the other hand, the shading data of the pixels that have output the image data is fed from the memory 3 to the D/A converter 81, where the shading data is converted into analog data and is then fed to the COR 42. In the COR 42, the shading data fed thereto from the D/A converter 81 is subtracted from the image data fed thereto from the temperature compensation circuit 44. The thus corrected image data is converted into digital data by the A/D converter 21, and is then output to the device 5.

In practicing the present invention, all the circuits and components other than the device 5 may be integrated together into a one-chip semiconductor device. In cases where temperature compensation is performed on the shading data as in the first and second embodiments, the second term (nkT)/q of Equation (8) varies with temperature, and thus contrast varies accordingly; on the other hand, in cases where temperature compensation is performed on the image data as in the third and fourth embodiments, the second term (nkT0)/q of Equation (10) does not vary with temperature but remains constant, and thus compensation is achieved also in terms of contrast In cases where the image data is first subjected to compensation using the shading data and is then converted into digital data as in the second and fourth embodiments, it is possible to obtain full-range data in the form of a digital signal without sacrificing the resolution of the data.

As described heretofore, according to the present invention, the output of a solid-state image-sensing device is subjected to temperature compensation. Thus, even if the temperature of the solid-state image-sensing device differs between when illuminated with uniform light and when shooting an image, there occurs no error due to temperature variation. This helps improve the quality of the image sensing output obtained. Moreover, there is no need to acquire shading data every time shooting is performed, and thus there is no need to provide a means for irradiating uniform light to obtain uniform light every time shading data is acquired. This ensures faster data processing, and thus a better response, during image shooting.

What is claimed is:

1. An image-sensing apparatus comprising:
   a solid-state image-sensing device having a plurality of pixels, each having a characteristic that an output voltage thereof varies natural-logarithmically in accordance with an amount of light received by the respective pixel;
   a detector for detecting a temperature of the solid-state image-sensing device;
   a storage device for storing first output data as to the output voltages from each respective pixel of the solid-state image-sensing device, and for storing first temperature data as to the temperature of the solid-state image-sensing device as detected on acquisition of the first output data;
   a calculator for calculating, on a basis of the first temperature data stored in the storage device and second temperature data as to the temperature of the solid-state image-sensing device as detected by the detector during image shooting, a temperature ratio between the first and second temperature data;
   a first corrector for correcting, on a basis of the temperature ratio calculated by the calculator, the first output data of each respective pixel stored in the storage device; and
   a second corrector for correcting, on a basis of the first output data of each respective pixel corrected by the first corrector, second output data as to the output voltages from each respective pixel of the solid-state image-sensing device as acquired during image shooting.

2. An image-sensing apparatus as claimed in claim 1, further comprising:
   a converter for performing analog-to-digital conversion on the output voltages from each respective pixel of the solid-state image-sensing device,
   wherein the second output data are digital data that have already been subjected to the analog-to-digital conversion performed by the converter.

3. An image-sensing apparatus as claimed in claim 1, further comprising:
   a converter for performing analog-to-digital conversion on the output voltages from each respective pixel of the solid-state image-sensing device,
   wherein the second output data are analog data that have not yet been subjected to the analog-to-digital conversion performed by the converter.

4. An image-sensing apparatus comprising:
   a solid-state image-sensing device having a plurality of pixels, each having a characteristic that an output voltage thereof varies natural-logarithmically in accordance with an amount of light received by each respective pixel;
   a detector for detecting a temperature of the solid-state image-sensing device;
   a storage device for storing first output data as to the output voltages from each respective pixel of the solid-state image-sensing device, and for storing first temperature data as to the temperature of the solid-state image-sensing device as detected on acquisition of the first output data;
   a calculator for calculating, on a basis of the first temperature data stored in the storage device and second temperature data as to the temperature of the solid-state image-sensing device as detected by the detector during image shooting, a temperature ratio between the first and second temperature data;
   a first corrector for correcting, on a basis of the temperature ratio calculated by the calculator, second output data as to the output voltages from each respective pixel of the solid-state image-sensing device as acquired during image shooting; and
   a second corrector for correcting, on a basis of the first output data of each respective pixel that is stored in the storage device, the second output data of each respective pixel that has been corrected by the first corrector.

5. An image-sensing apparatus as claimed in claim 4, further comprising:
   a converter for performing analog-to-digital conversion on the output voltage from each respective pixel of the solid-state image-sensing device,
   wherein the second output data are digital data that have already been subjected to the analog-to-digital conversion performed by the converter.

6. An image-sensing apparatus as claimed in claim 4, further comprising:
   a converter for performing analog-to-digital conversion on the output voltages from each respective pixel of the solid-state image-sensing device,
   wherein the second output data are analog data that have not yet been subjected to the analog-to-digital conversion performed by the converter.

7. An image-sensing apparatus comprising:
   a solid-state image-sensing device having a plurality of pixels, each having a characteristic that an output voltage thereof varies natural-logarithmically in accordance with an amount of light received by the respective pixel;
   calibration means for calibrating, on a basis of calibration data for correcting variations in the output voltages from each respective pixel of the solid-state image-sensing device, output data as to the output voltages from each respective pixel of the solid-state image-sensing device as acquired during image shooting; and
   temperature compensation means for performing temperature compensation, on a basis of temperatures of the solid-state image-sensing device as detected during acquisition of the calibration data and as detected during image shooting, on one of the calibration data of each respective pixel and the output data of each respective pixel acquired during image shooting.

8. An image-sensing apparatus as claimed in claim 7,
   wherein the calibration data are data as to the output voltages from the individual pixels of the solid-state image-sensing device as acquired when uniform light is shone on the solid-state image-sensing device.

9. A method of calibrating a solid-state image-sensing device having a plurality of pixels, each having a characteristic that an output voltage thereof varies natural-logarithmically in accordance with an amount of light received by the respective pixel, comprising the steps of:
   performing temperature compensation, on a basis of temperatures of the solid-state image-sensing device as detected during acquisition of calibration data for correcting variations in the output voltages from each respective pixel of the solid-state image-sensing device, and as detected during image shooting, on the calibration data; and calibrating, on a basis of the calibration data thus subjected to temperature compensation, output data as to the output voltages from each individual pixel of the solid-state image-sensing device as acquired during image shooting.

10. A method of calibrating a solid-state image-sensing device as claimed in claim 9, wherein the calibration data are data as to the output voltages from each respective pixel of the solid-state image-sensing device as acquired when uniform light is shone on the solid-state image-sensing device.

11. A method of calibrating a solid-state image-sensing device having a plurality of pixels, each having a characteristic that an output voltage thereof varies naturallogarithmically in accordance with an amount of light received by the respective pixel, comprising the steps of:

performing temperature compensation, on a basis of temperatures of the solid-state image-sensing device as detected during acquisition of calibration data for correcting variations in the output voltages from each respective pixel of the solid-state image-sensing device and as detected during image shooting, on output data as to the output voltages from each respective pixel of the solid-state image-sensing device as acquired during image shooting; and calibrating, on a basis of the calibration data, the output data of each respective pixel thus subjected to temperature compensation.

12. A method of calibrating a solid-state image-sensing device as claimed in claim 11, wherein the calibration data are data as to the output voltages from each respective pixel of the solid-state image-sensing device as acquired when uniform light is shone on the solid-state image-sensing device.

13. An image-sensing apparatus comprising:

a solid-state image-sensing device having a plurality of pixels, each pixel having a characteristic that an output thereof varies in accordance with an amount of light received by the pixel;

a detector for detecting a temperature of the solid-state image-sensing device;

a storage device for storing first output data from the solid-state image-sensing device as acquired during calibration and for storing first temperature data based on the temperature of the solid-state image-sensing device as detected during acquisition of the first output data; and a calculating device adapted to:

receive second output data from the solid-state image-sensing device as acquired during shooting;

receive second temperature data from the detector as detected during acquisition of the second output data;

receive first output data and first temperature data from said storage device;

compute corrected first output data based said first output data and both of said first and second temperature data; and compute corrected second output data based on said second output data and said corrected first output data.

14. An image-sensing apparatus as claimed in claim 13, further comprising:

an A/D converter for performing analog-to-digital conversion of the output from the solid-state image-sensing device, wherein the second output data, as received by the calculating device, is digital data that has already been subjected to the analog-to-digital conversion by the converter.

15. An image-sensing apparatus as claimed in claim 13, further comprising:

an A/D converter for performing analog-to-digital conversion of the output from the solid-state image-sensing device, wherein the second output data, as received by the calculating device, is analog data that has not been subjected to analog-to-digital conversion by the converter.

16. An image-sensing apparatus as claimed in claim 13, wherein said first output data is acquired based on shining uniform light on the solid-state image-sensing device.

17. An image-sensing apparatus comprising:

a solid-state image-sensing device having a plurality of pixels, each pixel having a characteristic that an output thereof varies in accordance with an amount of light received by the pixel;

a detector for detecting a temperature of the solid-state image-sensing device;

a storage device for storing first output data from the solid-state image-sensing device as acquired during calibration and for storing first temperature data based on the temperature of the solid-state image-sensing device as detected during acquisition of the first output data;

a calculating device, which is adapted to:

receive second output data from the solid-state image-sensing device as acquired during shooting;

receive second temperature data from the detector as detected during acquisition of the second output data;

receive first output data and first temperature data from said storage device;

compute temperature-corrected second output data based on said second output data and said first and second temperature data; and compute uniformity-corrected second output data based on said temperature-corrected second output data and said first output data.

18. An image-sensing apparatus as claimed in claim 17, further comprising:

an A/D converter for performing analog-to-digital conversion of the output from the solid-state image-sensing device, wherein the second output data, as received by the calculating device, is digital data that has already been subjected to the analog-to-digital conversion by the converter.

19. An image-sensing apparatus as claimed in claim 17, further comprising:

an A/D converter for performing analog-to-digital conversion of the output from the solid-state image-sensing device, wherein the second output data, as received by the calculating device, is analog data that has not been subjected to analog-to-digital conversion by the converter.

20. An image-sensing apparatus as claimed in claim 17, wherein said first output data is acquired based on shining uniform light on the solid-state image-sensing device.

21. An image-sensing apparatus, comprising:

a solid-state image-sensing device having a plurality of pixels, each pixel having a characteristic that an output thereof varies in accordance with a quality of light received by the pixel;

normalization means for correcting, based on normalization data, nonuniformity in output data from each pixel of the solid-state image-sensing device, said output data being acquired during image shooting; and temperature compensation means for performing temperature compensation, based on a temperature of the solid-state image-sensing device as detected during acquisition of the normalization data and a temperature of the solid-state image-sensing device as detected during image shooting, on one of the normalization data and the output data.

22. An image-sensing apparatus as claimed in claim 21, wherein the normalization data is based on output from the individual pixels of the solid-state image-sensing device when uniform light is shone on the solid-state image-sensing device.

23. A method of calibrating a solid-state image-sensing device having a plurality of pixels, each pixel having a characteristic that an output thereof varies in accordance with an amount of light received by the pixel, comprising the steps of:

performing temperature compensation on normalization data, said normalization data for correcting nonuniformity in the output voltages from each respective pixel of the solid-state image-sensing device, based on a temperature of the solid-state image-sensing device as detected during acquisition of normalization data and a temperature of the solid-state image-sensing device as detected during image shooting; and normalizing output data from each pixel of the solid-state image-sensing device as acquired during image shooting, based on the normalization data thus subjected to temperature compensation.

24. A method of calibrating a solid-state image-sensing device as claimed in claim 23, wherein the normalization data is based on output from the individual pixels of the solid-state image-sensing device when uniform light is shone on the solid-state image-sensing device.

25. A method of calibrating a solid-state image-sensing device having a plurality of pixels, each pixel having a characteristic that an output thereof varies in accordance with a quality of light received by the pixel, comprising the steps of:

performing temperature compensation on output data from each pixel of the solid-state image-sensing device as acquired during image shooting, based on a temperature of the solid-state image-sensing device as detected during acquisition of normalization data, said normalization data for correcting nonuniformity in the output voltages from each respective pixel of the solid-state image-sensing device, and a temperature of the solid-state image-sending device as detected during image shooting; and normalizing the output data of each respective pixel thus subjected to temperature compensation, based on the normalization data.

26. A method of calibrating a solid-state image-sensing device as claimed in claim 25, wherein the normalization data is based on output from the individual pixels of the solid-state image-sensing device when uniform light is shone on the solid-state image-sensing device.

27. An image-sensing apparatus as claimed in claim 1, wherein the first output data are data as to the output voltages from the individual pixels of the solid-state image-sensing device as acquired when uniform light is shone on the solid-state image-sensing device.

28. An image-sensing apparatus as claimed in claim 4, wherein the first output data are data as to the output voltages from the individual pixels of the solid-state image-sensing device as acquired when uniform light is shone on the solid-state image-sensing device.

* * * * *